Patented Nov. 16, 1943

2,334,666

UNITED STATES PATENT OFFICE 2,334,666

CONTROL SYSTEM OF BOILING AND CANNING RICE

Milton Yonan-Malek, San Francisco, Calif.

No Drawing. Application July 23, 1940,
Serial No. 346,988

8 Claims. (Cl. 99—186)

The present invention is a continuation in part of my co-pending application, Serial No. 339,718, filed June 10, 1940, and entitled Method and control system for treating and canning rice.

The primary object of the present improvement is to provide a system of treating rough rice or rice paddy whereby an appreciable reduction in the amount of time and equipment involved is attained in preparing the paddy for milling, as well as appreciable reduction in the overall expense of handling the rice.

More specifically, one of the important objects of the present invention is to provide a control system involving the immersion of the paddy in water at predetermined temperatures and reduced time intervals to afford adequate soaking of the paddy; the boiling of the paddy for a predetermined time interval at predetermined pressures; and the control of the water content of the soaked and boiled paddy to insure maximum yield of head rice upon milling.

Another object of the present improvement is to provide a control system for boiling and canning rice wherein substantially all of the nutritive values of the rice are retained and whereby a flaky, non-pasty, substantially white canned boiled rice is obtained.

The foregoing and other objects are attained in the preferred and modified processes of my present improvement hereinafter described. It is to be understood that while certain preferred and modified modes of preparation of rice paddy for milling and canning are set forth below, I am not to be limited to the precise steps nor the precise arrangement of steps or sequence thereof set forth, as my invention, as defined in the appended claims, can be practiced in a plurality and variety of ways.

The preferred mode of treatment of rough rice or paddy in accordance with my present improvement comprises subjecting the rough paddy to soaking at predetermined temperatures for relatively short time intervals to effect the taking up by the paddy of a predetermined quantity of water; subjecting the paddy containing such predetermined water content to steaming under predetermined pressures and for a predetermined time interval; removing water from the paddy taken up in the soaking and steaming steps so that the water content thereof is not greater than approximately fifteen per cent; then milling the paddy while containing the latter water content; and finally canning the milled rice under standard canning processes including heat treatment to destroy pathogenic or spoilage organisms.

In accordance with the preferred mode of treatment of rice paddy, a quantity of the paddy is placed in an autoclave containing sufficient water to immerse the paddy completely, the water preferably being maintained at a temperature in the neighborhood of 205° F. The paddy is retained in the water only such length of time as to thoroughly soak the same, which may run from one to two minutes and is then subjected to steam under pressure of approximately fifteen pounds per square inch while the water is being withdrawn, the boiling at such pressure being carried out for approximately fifteen minutes After steaming for the specified period, the paddy is withdrawn from the autoclave and placed in a drier to remove appreciable quantity of water that has been absorbed by the paddy in the soaking and steaming steps of the process, the drying preferably being limited so that the paddy will retain from 11% to 15% water content, whereafter the paddy is milled in accordance with standard milling practice. It has been found that presenting the paddy to the mill with the water content as specified, that an increased yield of head rice is obtained. Moreover, I have found that controlling the soaking and steaming steps to the extent hereinabove described results in the absorption by the paddy of approximately forty-five per cent of water which is an optimum water content for the parboiling of the paddy.

While I have stated that the foregoing steps comprise the preferred mode of treatment of the rice paddy to prepare the same for milling, I have also prepared the paddy under modified adaptations of such steps with successful and efficacious results. For example, a modified mode of treatment comprises soaking the paddy for progressively increasing time intervals at progressively decreasing water temperature. A soaking period of approximately two hours, in water maintained at a temperature in the neighborhood of 160° F., has been found highly satisfactory, especially when steam is applied to the paddy before all of the soaking water has been removed, or when the paddy has a water content of approximately forty-five per cent. The process has been carried out, in a modified way, by soaking the paddy for a period of from three to four hours at a temperature ranging between 120° F. to approximately 100° F., and then subjecting the soaked paddy to steam at a pressure of approximately fifteen pounds per square inch for a period of substantially fifteen minutes; then drying the soaked and steamed paddy to the extent of removing all but approximately 11% to 15% water, after which it is milled with such water content in accordance with standard milling practice.

I have also successfully practiced a still further modified mode of preparing the rice paddy for milling, and subsequent canning. In this modified system, the rice paddy is conveyed from storage to and through a reflux chamber wherein it is simultaneously soaked in water and parboiled by steaming. The reflux chamber can contain suitable cooling pipes, means for injecting steam under pressure of approximately fifteen pounds per square inch, together with a suitable belt conveyer for moving the rice paddy through the chamber at a predetermined rate so that it will be subjected to parboiling and soaking for a period of substantially fifteen minutes; the cooling pipes being supplied constantly with a coolant so that condensate will continuously drop upon the bed of rice paddy on the conveyer belt as it passes the paddy through the chamber. The size of the reflux chamber, of course, depends upon the quantity of rice paddy desired to be treated. After simultaneous soaking and steaming, the paddy is conveyed to a suitable drier where the water content thereof is reduced to approximately 11% to 15% whereupon it is conveyed to a mill for treatment for removing the hull, and polishing if desired. Variations of reflux chambers, of course, can be made. For example, a portion of the reflux chamber can contain cooling pipes while another portion has no pipes, so that the paddy will be first thoroughly soaked by the reflux condensate and then steamed. In other words, the percentage of water absorbed by the paddy can thus be controlled to insure optimum results.

The foregoing described preferred and modified modes of preparing the rice paddy for milling and subsequent canning involves comparatively inexpensive equipment and requires a relatively short time to treat a predetermined quantity of paddy. Because of the inexpensive treating units, and dispatch in handling, duplication or multiplication of equipment to take care of relatively large quantities of the paddy can readily be set up with economy. Suitable temperature control units for regulating the temperature of the soaking water, together with conventional pressure-lock equipment for reducing the pressure on the paddy beds to atmospheric pressure can be interposed in the system, after withdrawal from the autoclave or the reflux chamber as the case may be. In all of the foregoing modes of preparing the paddy for milling, an elapsed time either of only twenty minutes, or an elapsed time of not more than four hours occurs.

While the product of soaking and parboiling rice paddy in accordance with the hereinabove described preferred and modified processes, together with subsequent milling, possesses a brownish tinge and, hence, might be deemed undesirable if marketed in bulk because the public has become accustomed to rice grains having a substantially white appearance, it may be observed that the product of my improved process has a higher nutritive value than unparboiled or raw, milled rice. Moreover, it also is to be observed that such brownish tinge of the rice kernels, after milling, is largely superficial for it disappears almost entirely upon cooking and canning under conventional canning practice including heat processing. In other words, the canned boiled rice product of the improved process is substantially white, flaky and non-gelatinous in appearance, and not gritty.

An effective canning procedure for the rice treated and milled, as aforesaid, preferably is the same as that described in connection with the process set forth in my above identified copending application. Preferably, this canning procedure consists in first washing or rinsing the milled, parboiled rice in a colander in cold running water to remove dust and any other extraneous material, and then heating the same in a vessel in an excess of water to substantially a boiling temperature. The rice, of course, is stirred constantly during the heating stage to prevent it from settling. Thereafter, the rice is drained and then packed in cans but not compressed; the cans being then sealed under a vacuum in accordance with standard methods. In order to destroy pathogenic or spoilage organisms, the sealed containers are heat processed, preferably by steam under pressure and thereafter cooled. In carrying out the heat processing, the cans are placed in a cradle, and the cradle is disposed in an autoclave. With the lid of the autoclave closed, live steam is blown therethrough with vents open to remove all air from the autoclave. Thereafter the vents are closed and steam admitted for approximately thirty minutes at atmospheric pressure until a temperature of approximately 210° F. in the autoclave is reached. Then the steam pressure is raised to fifteen pounds above atmospheric to produce a temperature of approximately 240° F. in the autoclave, which temperature is maintained for approximately fifty to seventy minutes. Thereafter, pressure is released, steam shut off entirely and the lid of the autoclave opened. The autoclave is allowed to cool for about ten minutes and cold water run therein so as to cover the cans, the cans being agitated in the cold water. When the temperature has been reduced to around 80° F. to 85° F., the cans are removed and packed in a case. The essence of the process of my invention is that the treatment so tempers the rice grains that they will withstand severe conditions required in canning regulations without becoming of undesirable consistency and unpalatable.

I claim:

1. A process of treating rice paddy to prepare the same for milling, said process comprising soaking the paddy in water having a temperature of substantially 205° F. for a period of from one to two minutes, then subjecting the paddy to steam under pressure of approximately fifteen pounds per square inch for a period of substantially fifteen minutes and while withdrawing the water from the paddy, then drying the soaked parboiled paddy to a water content of not more than fifteen per cent and milling the rice paddy while containing said reduced water content.

2. A process of preparing a canned boiled rice having a substantially white, flaky appearance, said process comprising the steps of soaking the paddy in water having a temperature of approximately 205° F. for a period of from one to two minutes, subjecting the paddy to steam under pressure of approximately fifteen pounds per square inch for a period of approximately fifteen minutes while withdrawing the water from the paddy, drying the soaked parboiled paddy to a water content of approximately eleven to fifteen per cent, milling the parboiled paddy while containing such water content, then cooking the milled parboiled rice and packing in cans, and then sealing the packed cans under a vacuum.

3. A process of putting up boiled rice in cans whereby the natural and substantially all of the vitamin content thereof is retained and the canned rice is substantially white, flaky and non-felatinous, said process comprising the steps of conveying a bed of rice paddy under a shower of water for and simultaneously subjecting said bed of rice paddy to live steam under pressure of aproximately fifteen pounds per square inch until the rice paddy has absorbed approximately forty-five per cent of the amount of water it is capable of absorbing and the rice paddy is parboiled, removing the bed of paddy from the shower of water and the action of the steam and drying the same to an extent that aproximately eleven to fifteen per cent of water is retained by the paddy, milling the paddy while containing such reduced amount of water, rinsing the thus milled rice in cold water and cooking the rinsed rice at substantially boiling temperature, disposing the cooked rice in cans, sealing the cans of rice under a vacuum, and then heating the cans of rice at a temperature in the neighborhood of but not exceeding 240° F. for a period of approximately fifty minutes.

4. A process of preparing rice which results in the retention of natural nutritive values and substantially all natural vitamins, said process comprising the steps of soaking a desired quantity of rice paddy in hot water for a period of time sufficient for the absorption by the paddy of approximately forty-five per cent of the maximum amount of water capable of absorption thereby, subjecting the soaked paddy containing such water content to live steam under pressure of approximately fifteen pounds per square inch and for a period of approximately fifteen minutes to parboil the paddy, then drying the thus soaked and parboiled paddy to an extent that it retains approximately eleven to fifteen per cent of absorbed water and milling the rice paddy while containing said reduced water content.

5. A process of preparing rice which results in the retention of substantially all natural vitamins thereof, said process comprising the steps of soaking rice paddy in water maintained at a temperature exceeding 200° F. but not greater than 240° F. for a period of from one to two minutes, then parboiling the thus soaked paddy with live steam under pressure of approximately fifteen pounds per square inch for approximately fifteen minutes while simultaneously withdrawing a portion of the absorbed water from the rice, drying the rice paddy and reducing the water content in the rice paddy to an extent that it retains approximately eleven to fifteen per cent of absorbed water, and milling the rice paddy while containing said reduced water content.

6. In a process of preparing rice, the steps of soaking rice paddy in water maintained at a temperature of approximately 205° F. for a period of from one to two minutes so that the rice paddy absorbs approximately forty-five per cent of the maximum amount of water it can absorb, then parboiling the thus soaked rice paddy containing the aforesaid water content with steam for a period of approximately fifteen minutes and at a temperature of substantially 240° F., and drying the rice paddy and reducing the water content in the rice paddy so that it retains aproximately eleven to fifteen per cent of absorbed water.

7. A process of treating rice paddy comprising the steps of soaking rice paddy in hot water and subjecting the rice paddy to the action of steam to produce in the rice paddy a water content of approximately forty-five per cent of the maximum amount of water capable of absorption by the rice paddy and to parboil the rice paddy, drying the rice paddy and reducing the water content in the rice paddy to approximately eleven to fifteen per cent, and milling the rice paddy while containing said reduced water content.

8. A process of treating rice paddy comprising the steps of soaking rice paddy in hot water and subjecting the rice paddy to the action of steam under pressure of fifteen pounds per square inch prior to complete removal of hot water from the rice paddy to produce in the rice paddy a water content of approximately forty-five percent of the maximum amount of water capable of absorption by the rice paddy and to parboil the rice paddy, drying the rice paddy and reducing the water content in the rice paddy to approximately eleven to fifteen per cent, and milling the rice paddy while containing said reduced water content.

MILTON YONAN-MALEK.